United States Patent [19]

Stevens

[11] Patent Number: 5,798,152
[45] Date of Patent: Aug. 25, 1998

[54] BIODEGRADABLE COMPOSITE POLYMERIC ARTICLES COMPRISING POLYVINYL ALCOHOL

[75] Inventor: Henry Guy Stevens, St. Leonards, England

[73] Assignee: Novon International, Tonawanda, N.Y.

[21] Appl. No.: 332,634

[22] Filed: Oct. 31, 1994

Related U.S. Application Data

[63] Continuation of Ser. No. 30,148, Mar. 18, 1993, abandoned.

[30] Foreign Application Priority Data

Jul. 24, 1990 [GB] United Kingdom ............... 9016151

[51] Int. Cl.$^6$ ................................. B32B 7/02; B29C 45/14
[52] U.S. Cl. ................ 428/34.1; 264/514; 264/515;
  264/519; 425/35.2; 425/35.4; 425/366;
  425/212; 425/213; 425/217; 425/220; 425/913
[58] Field of Search ................ 428/411.1, 212,
  428/213, 217, 220, 34.1, 35.2, 35.4, 518,
  36.6, 36.7, 913, 336, 339; 383/1; 264/514,
  515, 519

[56] References Cited

U.S. PATENT DOCUMENTS

| | | | |
|---|---|---|---|
| 3,365,413 | 1/1968 | Monaghan et al. | 264/514 |
| 3,762,454 | 10/1973 | Wilkins, Jr. | 383/1 |
| 3,790,067 | 2/1974 | Scheier | 229/55 |
| 4,244,914 | 1/1981 | Ranalli et al. | 264/515 |
| 4,372,311 | 2/1983 | Potts | 428/332 X |
| 4,416,791 | 11/1983 | Hag | 252/90 |
| 4,444,839 | 4/1984 | Dudzik et al. | 428/336 |
| 4,529,775 | 7/1985 | Marten | 525/62 |
| 4,692,494 | 9/1987 | Sonenstein | 525/57 |
| 4,772,279 | 9/1988 | Brooks et al. | 604/339 |
| 4,906,495 | 3/1990 | Martini et al. | 428/36.7 |
| 5,051,222 | 9/1991 | Marten et al. | 264/143 |
| 5,108,807 | 4/1992 | Tucker | 428/35.2 |
| 5,229,209 | 7/1993 | Gharapetian et al. | 428/403 |
| 5,389,425 | 2/1995 | Platt et al. | 428/195 |

Primary Examiner—H. Thi Le
Attorney, Agent, or Firm—Larson & Taylor

[57] ABSTRACT

Composite polymeric articles, which may be in layer or film form, comprise a larger portion of a polymer which is water soluble at 20° C. against a smaller proportion of a polymer which is substantially water-insoluble at that temperature. For example, a layer product may have a thin layer (e.g. less than 5 microns) of insoluble polymer superimposed on a thicker layer (e.g. at least 20 microns) of soluble polymer. Both polymers are conveniently polyvinyl alcohol, which is non-toxic and useful in a number of domestic applications, e.g. as a diaper backing sheet. The insoluble portion gives water resistance but negligible mechanical strength; the soluble part gives the mechanical strength. On dissolution of the soluble portion, the insoluble portion disintegrates mechanically. Articles may be made by co-extrusion or by molding.

23 Claims, 2 Drawing Sheets

BIODEGRADABLE COMPOSITE POLYMERIC ARTICLES COMPRISING POLYVINYL ALCOHOL

This is application is a continuation of application Ser. No. 08/030,148 filed on Mar. 18, 1993 COMPOSITE POLYMERIC ARTICLES now abandoned.

BACKGROUND OF THE INVENTION

1. Field of the Invention

This invention relates to articles, and in particular aspects to articles in sheet form, which are composites of two organic polymers having different properties. Important applications of this invention concern articles and materials which can readily be disposed of when no longer required.

2. Description of the Prior Art

It has been known to make polymeric articles which are purposely designed to be able to be destroyed by dissolving them, using soluble polymers such as polyvinyl alcohol. Polyvinyl acetate is a water-insoluble polymer which is obtained by polymerization of vinyl acetate. This polymer is used for the production of polyvinyl alcohol by hydrolysis or alcoholysis to remove the acetyl groups from polyvinyl acetate. This removal of acetyl groups may be carried to partial completion so as to give a product which is a copolymer of vinyl alcohol and vinyl acetate. If vinyl alcohol predominates, but there is still a substantial quantity of vinyl acetate present, such a copolymer is soluble in cold water and is frequently referred to as "partially hydrolyzed" polyvinyl alcohol. The residual vinyl acetate content is typically about 11 wt % corresponding to about 12 mol %. If the reaction is taken further, close to completion, the crystallinity of the polyvinyl alcohol increases and the solubility in cold water decreases very markedly. Material of this type is referred to as "fully hydrolyzed" polyvinyl alcohol. Its content of residual vinyl acetate is typically no greater than 3 mol %.

Polyvinyl alcohol can be made into film or sheet form. U.S. Pat. No. 4,444,839 (Hoechst) describes PVA labels which are soluble only in hot water, but which have an adhesive fixing layer which can dissolve in cold water enabling easy detachment of the label. The adhesive may be a polyvinyl alcohol.

It is also known to make hospital laundry bags from partially hydrolyzed polyvinyl alcohol sheet. The idea is that such bags can be filled with dirty laundry and the entire bag with its contents can then be put into a hospital washing machine where the polyvinyl alcohol will dissolve on contact with the wash water, thus releasing the laundry into the wash water.

In practice there is a difficulty that the laundry may itself be wet and if the wet laundry contacts the material of the bag it can dissolve it prematurely so that the bag falls apart. Unsuccessful attempts have been made to rectify this by modifying the solubility properties of the polyvinyl alcohol. For example, DE-A-3017246 (Melchior) describes laundry bags made primarily of relatively insoluble PVA which will not disintegrate except in hot water. To enable the desired emptying of the bag in a cold wash, a subsidiary inner layer of the bag is made of cold-soluble PVA which can form releasable welds.

SUMMARY OF THE INVENTION

Broadly, this invention provides an article or material comprising a first organic polymer which is water-soluble at a given temperature, typically 20° C., and a second organic polymer located directly adjacent thereto, which second organic polymer dissolves more slowly or not at all in water at the same given temperature e.g. 20° C., with the quantity by weight of the first (water-soluble) polymer being greater than the quantity of the second polymer.

It will be explained in more detail below that the first, water-soluble, polymer is partially hydrolyzed polyvinyl alcohol. The water-insoluble organic polymer is fully hydrolysed polyvinyl alcohol. Generally both polymers will feel dry, not tacky, to the touch.

In certain forms of this invention the article or material is laminar with adjacent layers of the two polymers. Such a form of the invention could be polymer film or sheet to be used in industrial production processes. Further forms of the invention are articles comprising pieces of such polymer sheet or film. In particular, the pieces of polymer sheet or film may be shaped to have curvature En more than one direction.

Articles and materials of this invention have the property that if an exposed surface of the first polymer is brought into contact with water, it dissolves but where a first polymer surface is overlaid by the second polymer that surface is protected. The second polymer acts as a barrier and protects the first polymer against dissolution if the protected surface gets wet.

Usually, the two types of polymer will be substantially co-extensive in the article or material e.g. a continuous uniform multilayer laminate film, or a body of the soluble polymer substantially surrounded by a coat of the insoluble polymer.

The second polymer can be a surprisingly thin layer, so thin that it does not remain intact after the first polymer dissolves. Then the first polymer is relied upon to provide mechanical strength while the second polymer is relied on for a water-barrier.

Such functionality has a wide range of applications. In general the articles and materials of the invention can be used where it can be arranged that at first the slower-dissolving second polymer acts as a barrier protecting the water-soluble polymer from a material which is, or might be, wet and then at a later stage an unprotected surface of the water-soluble polymer is allowed to come into contact with water. The consequence of this is that dissolution of the soluble polymer takes place when desired but premature dissolution is prevented by the second polymer.

One possibility, mentioned here as an illustration, is laundry bags made from polymer film which is water-soluble with a very thin layer of water-insoluble polymer on the inside of the bags. If the laundry happens to be wet, it will not cause the bags to dissolve prematurely because of the barrier function of the very thin insoluble layer. When the bags are put intact into a hospital washing machine the soluble layer is now contacted by the wash water on the outside of the bags and dissolves. The very thin insoluble layer rapidly breaks up, releasing the laundry into the wash water. The pieces of the insoluble layer are washed into the sewage system with the wash water at the end of the washing procedure.

The presence of insoluble polymer in the sewage system need not be a problem because the preferred material, namely fully hydrolyzed polyvinyl alcohol, is biodegradable.

Another possibility is to have a piece or layer of the first polymer surrounded by the second polymer, so that the article can maintain its integrity in the presence of water unless broken or ruptured, allowing water to attack the first polymer.

The preferred soluble polymer is partially hydrolyzed polyvinyl alcohol. As already mentioned above this is a copolymer of polyvinyl alcohol with vinyl acetate. Generally these copolymers are hydrolyzed to an extent between 75 and 95 mol %, more commonly between 80 and 90 mol %. Thus, the mole ratio of vinyl alcohol to vinyl acetate lies between 75:25 and 95:5, more preferably 80:20 and 90:10. Partially hydrolyzed polyvinyl alcohol is fully biodegradable. This has the considerable benefit that if the polymer is allowed to dissolve in water which is then run to waste, the polymer which enters the sewage system will degrade into ecologically acceptable products. For this reason it may be desirable that the soluble polymer does not incorporate any other monomer although the possibility of incorporating a further comonomer is not excluded by this invention.

The speed with which the more rapidly soluble first polymer dissolves can be altered by selection of the polymer and also by selection of processing conditions, as will be mentioned below. The length of time for this polymer to dissolve can be chosen according to the use envisaged for the article or material and can range from a matter of seconds to several hours.

The speed with which partially hydrolyzed polyvinyl alcohol dissolves decreases somewhat with increasing molecular weight of the polymer. Higher degrees of hydrolysis (so long as the material remains only partially hydrolyzed) tend to decrease speed of solution. Subjecting the polymer to heat during processing also retards the speed with which the eventual processed polymer will dissolve.

The more rapidly soluble polymer used in the present invention will generally have a speed of solution such that when a sheet of the polymer with at least one side face of the sheet exposed is placed in distilled water at 20° C., the sheet dissolves sufficiently to break up within a period of time not longer than 24 hours, usually not longer than 8 hours and possibly very much shorter than this e.g. less than 10 secs for a test sheet 50 µm thick.

The relatively less soluble polymer should of course dissolve more slowly than the more soluble polymer. For many applications it will be desirable that the polymer is essentially insoluble, to the extent that if a test sheet of the material with sufficient thickness to be handled, e.g. 50 µm, is placed in sterile distilled water at 20° C., the sheet remains undissolved and intact for a period exceeding 8 hours and perhaps more than 24 hours.

It is however possible that a soluble polymer which dissolves slowly will provide adequate barrier protection for a faster dissolving polymer in certain applications.

The relatively slowly dissolving polymer is preferably fully polyvinyl alcohol or a suitably insoluble polyvinyl alcohol copolymer. Fully-hydrolyzed PVAs are over 96 mol % hydrolyzed; commonly over 98 mol %. They are in fact appreciably water-soluble at raised temperatures, e.g. over about 50° C., and usually highly soluble over about 80° C., although some special types can withstand such temperatures for some time without dissolving. At about room temperature, however, solubility is sparing and particularly so for the more highly polymerised PVAs.

It will frequently be preferred that both polymers are biodegradable, meaning that when discarded into sewage or otherwise exposed to water and natural bacteria, they decompose to naturally occurring chemical species within a few months at most. Using polyvinyl alcohol for both layers achieves this result.

The articles of the invention will usually have the "insoluble" polymer exposed to the exterior. The soluble polymer may also be exposed, or may be enclosed by the insoluble polymer. However the insoluble layer will usually contact only the exterior and the more soluble polymer; not any adhesive or other type of layer.

In the article or material, the weight ratio of the more soluble to the less soluble polymer will preferably be at least 2:1, more preferably at least 3:1, still more preferably at least 5:1 and perhaps above 10:1 up to even 100:1, particularly for thick or three-dimensional articles.

In an alternative preferred aspect, the less soluble polymer covers the more soluble polymer with a general thickness which is preferably not more than 20 µm, more preferably not more than 10 µm, most preferably not more than 5 µm. It may be as thin as 2 µm or thinner.

In a film product, the total film thickness may range typically from 5 µm to 1 mm, more typically from 10 µm to 200 µm.

Each polymer may be used in admixture with other substances. In particular, a plasticizer is usually desirable to achieve a pliable film product. Glycerol, trimethylol propane, and glycols are suitable plasticizers. Colors and/or fillers may also be used if desired; in one or both layers. These may be conventional.

Articles may take various forms, for example, a film may comprise just two layers, one of each kind of polymer. Or, the film may be a sandwich of more soluble polymer between layers of less soluble polymer.

Non-film articles may comprise a "core" of the soluble polymer substantially or entirely covered by the less soluble polymer. Such an article can resist attack by water, but when it is broken water can dissolve the exposed core and hence the entire article may be disintegrated.

In another aspect, the invention provides processes for preparing composite articles and materials as described above.

There are a number of ways of forming respective portions e.g. layers of the two polymers superimposed and bonded together as a composite article e.g. film or sheet. Broadly these are various (a) casting/molding and (b) extrusion processes.

A cast/molding process for film or sheet involves forming a first of the layers—the less soluble one if PVA—on a flat or shaped surface and subsequently applying the second layer on top of it. Application may be e.g. by spraying or by a dripped feed. PVA can be applied with water e.g. as an aqueous solution or dispersion optionally containing plasticizers, thickeners etc. as appropriate, from which water is evaporated in forming the two layers of polymer.

Extrusion preferably involves co-extrusion of the two layers. Blown film co-extrusion is preferred.

The process can be an adaptation of the known process for forming a blown film from a single PVA polymer. The conventional production of PVA film by extrusion entails feeding a plasticized volume e.g. an aqueous solution or dispersion of the PVA, to a die with an annular extrusion orifice surrounding an air inlet. As the plasticized polyvinyl alcohol is extruded from the orifice it forms a tube which is blown out into a larger diameter tube by the pressure of air introduced through the air inlet. The blown tube is drawn off between a pair of nip rollers which close off the air space.

A high pressure, short screw extruder is suitable. This usually has a smooth bush, and e.g. a vibrating trickle feeder to avoid overloading the screw, which can be a problem with PVA.

A film-blowing process which is one aspect of this invention comprises supplying an appropriate extrudable form e.g. solution or dispersion of the polymers to respective extrusion orifices of a die, the orifices being annular and one within the other, so as to extrude tubes of the polymers from the orifices, while also supplying gas pressure to the interior of the inner tube thereby expanding both tubes and uniting the inner tube with the outer tube to form a single tube made up from layers of the two polymers.

The extrusion machinery can resemble conventional machinery for forming blown films of polyvinyl alcohol except however that its extrusion die has two annular orifices instead of the usual single orifice and a feed screw for each orifice with associated means for supply to each feed screw.

The gas which is blown in is suitably hot air, via an inlet within the inner annular slit. The heated air can also evaporate water from the PVA so that the film bubble dries and can be passed through e.g. nip rollers above the die.

Extrusion of PVA, including blown film extrusion, is known technology and the skilled man will be able to select suitable conditions, for example a die temperature in the region of 150° C., etc.

The relative rates of feed to the die orifices and concentrations of the polymers can be adjusted to achieve the desired ratio of thickness of the two layers.

Processing aids such as antifoamers and lubricants may be used if desired.

In a third aspect, the invention provides a co-extrusion apparatus adapted for producing bubble-blown film as described above.

Particular uses envisaged for the laminar articles include disposable packaging material and barrier layers in sanitary products e.g. diapers and bed-pan liners. These need to be able to withstand wetness on one side; by using film embodying the present invention they can after use be dropped, with their contents, into a WC bowl to disintegrate. The whole can then be flushed away. The advantage in terms of convenience is apparent, while from the environmental point of view PVA is not only biodegradable to harmless $CO_2$ and water, but also has no known toxicity and hence does not present a risk before chemical degradation.

BRIEF DESCRIPTION OF THE DRAWINGS

Embodiments of the invention are now described by way of example, with reference to the accompanying drawings in which.

DESCRIPTION OF THE PREFERRED EMBODIMENTS

Materials Used

In the following embodiments, both the insoluble and soluble layers were made from PVA. The PVAs used were "Mowiol" (Registered Trade Mark) obtainable from Hoechst AG. The soluble layers were made using Mowiol 26-88, a partially-hydrolyzed PVA having a mean molecular weight of 103000, an 88 mol % degree of hydrolysis and whose viscosity, measured as a 4% aqueous solution, is 26 mpa.s$^2$. The insoluble layers were made using (i) Mowiol 20-98, a fully-hydrolyzed grade in which the mean molecular weight, viscosity and hydrolysis values are 70,000, 20 mpa.s$^2$ and 98.4 mol % respectively, and (ii) a 50:50 blend of Mowiol 56/98 and Mowiol 28/99 which are fully-hydrolyzed grades having viscosities and hydrolysis values substantially as indicated by their respective specification numbers, as before.

For the cast processes, each of these was made up in a respective aqueous composition containing, by weight, 15% PVA granules 5% glycerine (plasticiser)

80% water.

The PVA granules were added to the water and glycerine and then heated at 93° C. for fifteen to twenty minutes to form a solution.

For the coextrusion process, the make-up of the individual PVA compositions can be selected in accordance with known criteria.

Co-extrusion Apparatus

Figure 1:
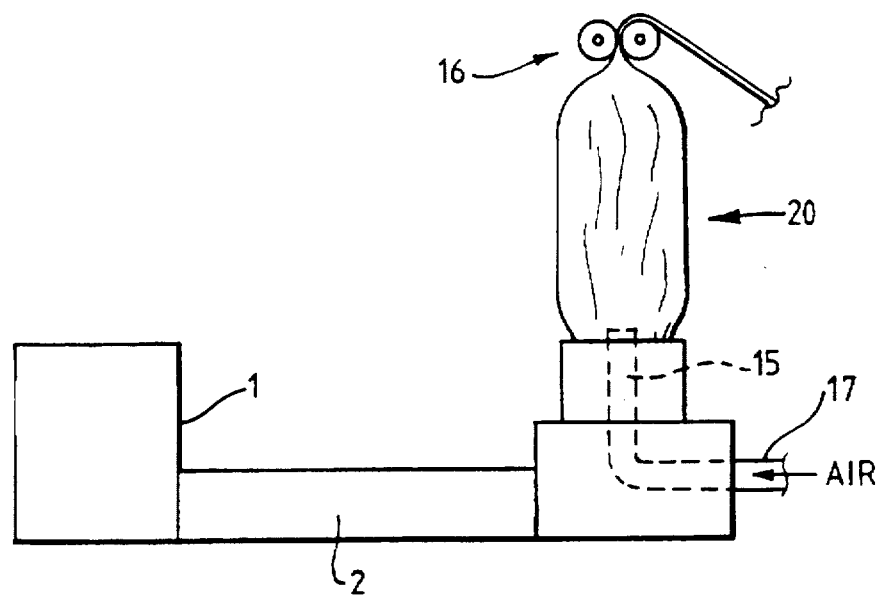
FIG. 1 is a schematic side view of a blown film co-extrusion apparatus.
Figure 2:
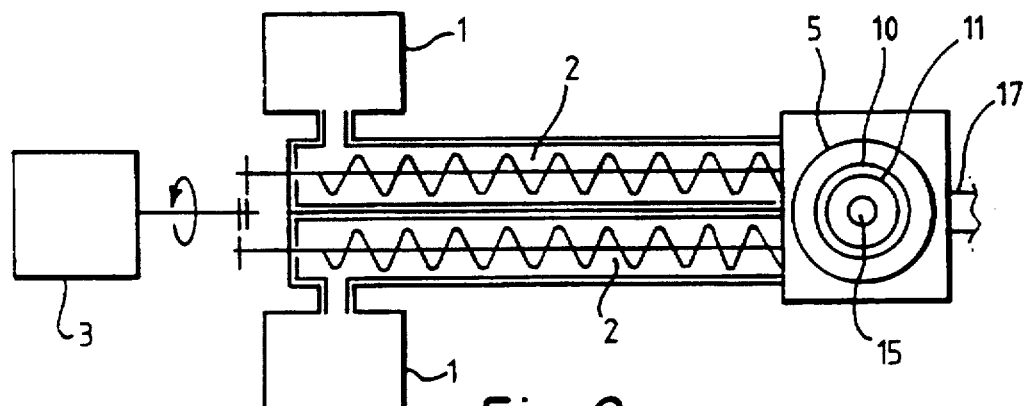
FIG. 2 is a schematic top view of the apparatus.
Figure 3:
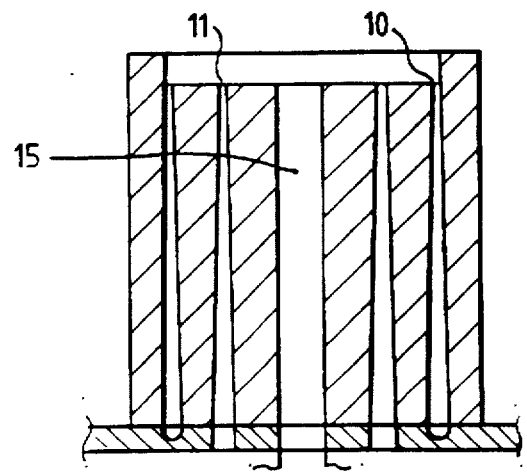
FIG. 3 is a schematic cross-section of the co-extrusion die of the apparatus.

An experimental apparatus was set up as shown schematically in FIGS. 1 to 3. A pair of heated supply tanks 1 were provided, one for each PVA type, and connected to respective intakes of a pair of 10 cm-long feed screws 2. A variable electric drive 3 was connected to drive the feed screws at predetermined proportional rates. Outputs from the feed screws 2 passed in conventional manner to respective extrusion inputs of an upwardly opening co-extrusion die 5. This had two circular and concentric extrusion slit openings 10,11. In the experimental apparatus the outer slit 10 had a diameter of 35 mm and the inner slit a diameter of 25 mm. The width of the outer slit 10 was approximately 0.5 mm and this was approximately four times the width of the inner slit 11. A centrally-opening hole 15 was provided in the die for blowing warm air up through the extrusion rings in conventional manner.

Vertically above the die, a pair of nip rollers 16 were mounted with a take off to a collecting point (not shown) for the film produced.

Co-extrusion Process

Aqueous extrudable PVA compositions are prepared as described above e.g. from Mowiol 26-88 and Mowiol 20-98, and each put in a respective heated tank 1 of the apparatus. The tank of Mowiol 26-88(soluble, partially hydrolyzed) composition communicates via its feed screw 2 with the outer, wider extrusion slit 10. The Mowiol 2098 (insoluble, fully hydrolyzed) composition communicates via its feed screw 2 with the inner, narrower extrusion slit 11.

The die is heated to 150° C. and the heated PVA compositions then fed to the die by their respective screws 2 at rates of e.g. 5:1 (soluble:insoluble). At the same time, warm air is blown to the air inlet 17 and out through the hole in the centre of the die 5. A blown film bubble 20 can thereby be formed above the die, with the thin insoluble PVA layer on the inside. Cooling air is blown, again in conventional manner, over the outside of the bubble above the die. The two extruded layers emerging from their respective slits 10,11 coalesce to form the composite film within a few millimeters of exiting the die.

The blown air dries the bubble rapidly to a non-tacky state such that it can be flattened between the nip rollers 16 and collected folded flat, to be cut open into single sheet form subsequently.

The process was repeated using the blend of Mowiol 56/98 and 28/99 in place of the Mowiol 20/98, to produce a still less soluble protective thin layer in the film.

Mold Process

Figure 4A:
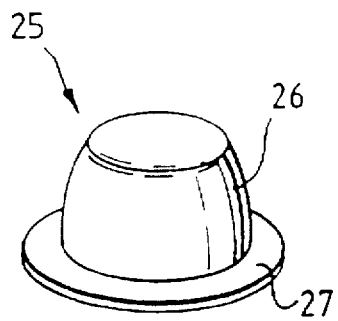
FIGS. 4a and 4b shows steps in making a baby's potty liner.
Figure 4B:
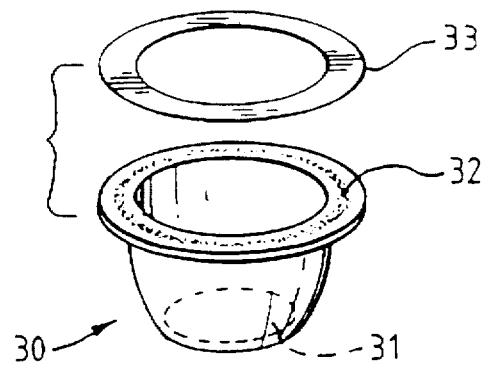

This process was used to make a liner for a child's potty. A convex mold surface 25 (see FIG. 4a) was prepared, made from a shaped metal sheet. This had a hat shape, with an upwardly-projecting central portion 26 and a surrounding bottom rim 27 for forming the rim of the liner.

An insoluble PVA layer was formed by spraying a solution of Mowiol 20-98 onto the outer, convex mold surface. The solution was as described previously under "Materials Used", but with the substitution of 10% cellulose ether thickener ("Tylose" (Registered Trade Mark)) for 10% of the water to improve adhesion of the PVA layer to the sloping sides of the mold 25. This first layer was then dried to tackiness by blowing it with warm air, and a second layer of a corresponding thickened aqueous solution of Mowiol 26-88 was sprayed over it to a considerably greater thickness. In particular, a pronouncedly thick layer was formed on the brim 27 of the former, to strengthen the rim of the liner.

After drying the water from this second coat using warm air blowers, the basic composite PVA liner 30 was lifted from the mold 25. An absorbent pad 31 of cellulose wadding was placed in its base, and the flat upper surface of the rim was given a coating of PVA adhesive 32 which was then covered by a ring of siliconized release paper 33.

In use, the insoluble inner layer of the liner was able to contain the potty contents for an extended period without leaking. To dispose of both liner and contents the release paper 33 was lifted off and two opposing sides of the rim stuck together face-to-face using the PVA adhesive coat 32, so as to form a sealed bag completely enclosing the contents. The whole was then taken to a WC and dropped into the water where after about ten seconds it had already broken up so much as to be fully flushable.

Again, the process was repeated using instead the 56/98 and 28/99 blend to form the insoluble layer. Improved resistance to water was noted.

Disposable Diaper

Figure 5:
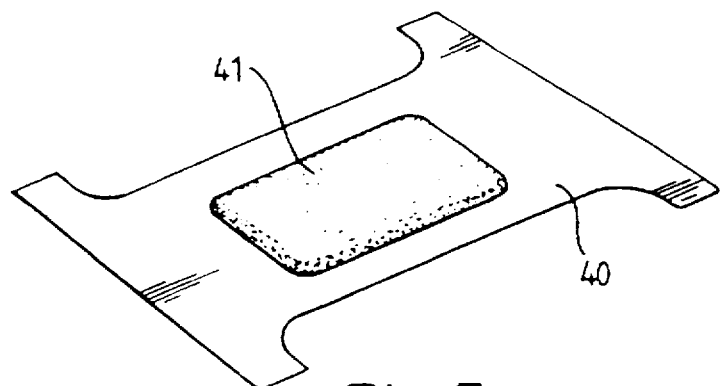
FIG. 5 shows a disposable diapers.

A backing sheet 40 for a disposable diaper was made by sequential spraying and drying of two different PVA layers as described above for the liner, but this time on a flat steel surface and without the Tylose thickener. The thicker, soluble layer formed the outside of the nappy and the thin, insoluble layer the inside (uppermost in FIG. 5). In the cast sheet, the more soluble layer may be about 0.1 mm thick and the less soluble layer about 0.02 mm, but these can be adjusted according to the required strength. A conventional cellulosic absorbent pad 41 was affixed to the thin insoluble layer using a commercial PVA adhesive.

In an experiment, aqueous liquid was poured onto the padding and the diaper was then rolled up. After being left for eight hours, the diaper was still intact and there was no leakage. However, on putting the rolled-up diaper into a bowl of water, it broke up in seconds and dispersed.

Figure 6:
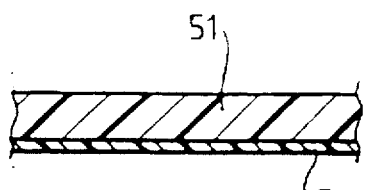
FIG. 6 shows a two layer film.
Figure 7:
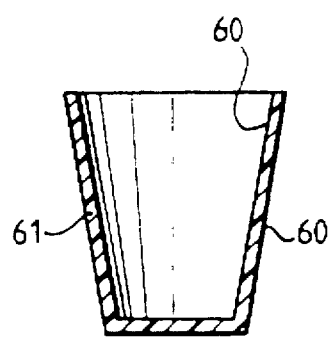
FIG. 7 shows a three-layer laminar article.
Figure 8:
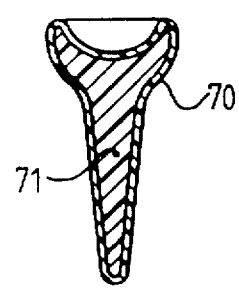
FIG. 8 shows a three-dimensional molded article.

FIGS. 6 to 8 illustrate schematically various forms of article embodying the invention.

FIG. 6 shows a two-layer flexible film comprising a layer 50 of fully-hydrolysed PVA, 3 μm thick, superimposed on a layer 51 of partially-hydrolyzed (soluble) PVA 25 μm thick.

FIG. 7 shows a disposable drinking cup made from a three layer laminar product. This has a thick intermediate layer 61 of partially-hydrolyzed PVA, perhaps 0.5 mm thick, giving mechanical strength to the cup. The inner and outer surfaces of the cup have a thin, 5 μm coating 60 of fully-hydrolyzed PVA which prevents outside moisture, and liquid in the cup, from attacking the intermediate layer 61. To render the cup disposable it need only be torn up, whereupon the intermediate layer is exposed and can be dissolved.

FIG. 8 shows a molded golf tee having a central core 71 of partially-hydrolyzed PVA forming the basic shape of the tee. 5 μm coating 70 of insoluble PVA covers the tee. The coating may be applied to the molded "soluble" tee by conventional methods. The tee can withstand normal use. If it is lost, any natural wear or damage will allow natural moisture to destroy it quickly and hence avoid a litter problem.

I claim:

1. A biodegradable polymeric composite comprising: a soluble body comprising partially hydrolyzed polyvinyl alcohol which is between 75 and 95 mole percent hydrolyzed, said soluble body being water-soluble at 20° C.; and an exterior layer covering said soluble body, the exterior layer having a thickness of 20 μm or less and comprising polyvinyl alcohol which is more than 96 mole percent hydrolyzed, a weight ratio of the soluble body to the exterior layer thereon being at least 2:1.

2. A biodegradable polymeric composite according to claim 1 wherein the polyvinyl alcohol of the exterior layer is at least 98 mole percent hydrolyzed.

3. A biodegradable polymeric composite according to claim 1 wherein the partially hydrolyzed polyvinyl alcohol of the solution body is between 80 and 90 mole percent hydrolyzed.

4. A biodegradable polymeric composite according to claim 1 wherein the exterior layer has a thickness of 10 μm or less.

5. A biodegradable polymeric composite according to claim 1 wherein the exterior layer has a thickness of 5 μm or less.

6. A biodegradable polymeric composite according to claim 1 wherein the weight ratio of the soluble body to the exterior layer thereon is at least 3:1.

7. A biodegradable polymeric composite according to claim 6 wherein the weight ratio of the soluble body to the exterior layer thereon is at least 5:1.

8. A biodegradable polymeric composite according to claim 1 wherein said soluble body is a soluble layer and the composite is in film form.

9. A biodegradable polymeric composite according to claim 8 wherein the partially hydrolyzed polyvinyl alcohol of the soluble layer is between 80 and 90 mole percent hydrolyzed.

10. A biodegradable polymeric composite according to claim 8 having a total film thickness between 0.5 μm and 1 mm.

11. A biodegradable polymeric composite according to claim 10 having a total film thickness between 10 μm and 200 μm.

12. A biodegradable polymeric composite according to claim 8 comprising:

a further exterior layer superimposed on the soluble layer, opposite the said exterior layer, whereby the soluble layer is between the exterior layer and the further exterior layer, said further exterior layer having a thickness of 20 μm or less and comprising polyvinyl alcohol which is more than 96 mole percent hydrolyzed, a weight ratio of the soluble layer to the further exterior layer being at least 2:1.

13. A biodegradable polymeric composite according to claim 12 wherein the soluble layer, the exterior layer and the further exterior layer are formed together by co-extrusion.

14. A biodegradable polymeric composite according to claim 1 wherein the soluble layer and the exterior layer are formed together by co-extrusion.

15. A method of forming a biodegradable polymeric composite film, comprising co-extruding a soluble layer of partially hydrolyzed polyvinyl alcohol which is between 75 and 95 mole percent hydrolyzed, said soluble layer being water-soluble at 20° C., and an exterior layer covering said soluble layer, the exterior layer having a thickness of 20 μm or less and comprising polyvinyl alcohol which is more than 96 mole percent hydrolyzed, a weight ratio of the soluble layer to the exterior layer thereon being at least 2:1.

16. A method according to claim 15 in which the polyvinyl alcohol of the exterior layer is more than 98 mole percent hydrolyzed.

17. A method according to claim 15 in which the partially hydrolyzed polyvinyl alcohol of the soluble layer is between 80 and 90 mole percent hydrolyzed.

18. A method according to claim 15 which forms said exterior layer with a thickness of 10 μm or less.

19. A method according to claim 18 which forms said exterior layer with a thickness of 5 μ/m or less.

20. A method according to claim 15 in which the weight ratio of the soluble layer to the exterior layer thereon is at least 3:1.

21. A method according to claim 20 in which the weight ratio of the soluble layer to the exterior layer thereon is at least 5:1.

22. A method according to claim 15 in which the co-extrusion is blown-film co-extrusion.

23. A method according to claim 15 in which said co-extrusion co-extrudes a further exterior layer on the soluble layer, on that side of the soluble layer opposite the said exterior layer, whereby the soluble layer is between the exterior layer and the further exterior layer, said further exterior layer having a thickness of 20 μm or less and comprising polyvinyl alcohol which is more than 96 more percent hydrolyzed, a weight ratio of the soluble layer to the further exterior layer being at least 2:1.

* * * * *